(12) United States Patent
Thomason

(10) Patent No.: US 10,509,419 B2
(45) Date of Patent: Dec. 17, 2019

(54) COMPUTER CONTROLLED FURNITURE AND METHOD

(71) Applicant: Sony Interactive Entertainment Europe Limited, London (GB)

(72) Inventor: Andy Thomason, London (GB)

(73) Assignee: Sony Interactive Entertainment Europe Limited (GB)

(*) Notice: Subject to any disclaimer, the term of this patent is extended or adjusted under 35 U.S.C. 154(b) by 305 days.

(21) Appl. No.: 14/816,537

(22) Filed: Aug. 3, 2015

(65) Prior Publication Data

US 2016/0048134 A1 Feb. 18, 2016

(30) Foreign Application Priority Data

Aug. 12, 2014 (GB) .................................. 1414290.5

(51) Int. Cl.
*G05D 7/06* (2006.01)
*A63G 31/16* (2006.01)
(Continued)

(52) U.S. Cl.
CPC ................. *G05D 7/06* (2013.01); *A47C 7/14* (2013.01); *A47C 27/082* (2013.01); *A47C 27/10* (2013.01);
(Continued)

(58) Field of Classification Search
CPC .............................................. A63F 2300/1062
See application file for complete search history.

(56) References Cited

U.S. PATENT DOCUMENTS 3,983,640 A 10/1976 Cardullo et al.
5,975,629 A * 11/1999 Lorbiecki ............ B60N 2/4415
297/200
(Continued)

FOREIGN PATENT DOCUMENTS

FR 2696859 A1 4/1994
GB 2182844 A 5/1987
(Continued)

OTHER PUBLICATIONS

Extended European Search Report for Application No. EP15179627 dated Jul. 5, 2016.
(Continued)

*Primary Examiner* — Ziaul Karim
*Assistant Examiner* — Vincent W Chang
(74) *Attorney, Agent, or Firm* — Lerner, David, Littenberg, Krumholz & Mentlik, LLP

(57) ABSTRACT

A re-configurable item of furniture is provided, and includes at least a first reconfigurable portion having in turn a plurality of deformable cells, each having electrically operated valves to control a gas inflow to the respective cells from a gas inflow source, and a gas outflow from the respective cells, to thereby modify the pressure within respective cells. The gas inflow source includes a high-pressure reservoir cell among the plurality of deformable cells. The item of furniture also includes a control unit arranged to transmit control signals to a plurality of the electrically operated valves, including a valve of the high-pressure reservoir cell, to modify the pressure within a plurality of the cells in a coordinated manner selected to generate a new configuration of support for a user of the furniture.

13 Claims, 7 Drawing Sheets

(51) Int. Cl.
  *A63F 13/98*  (2014.01)
  *A63F 13/285*  (2014.01)
  *A47C 7/14*  (2006.01)
  *A47C 27/08*  (2006.01)
  *A47C 27/10*  (2006.01)
  *G05B 15/02*  (2006.01)
  *G09B 9/00*  (2006.01)
  *A63F 13/803*  (2014.01)
  *G09B 9/12*  (2006.01)

(52) U.S. Cl.
  CPC ............ *A63F 13/285* (2014.09); *A63F 13/98* (2014.09); *A63G 31/16* (2013.01); *G05B 15/02* (2013.01); *A63F 13/803* (2014.09); *G09B 9/00* (2013.01); *G09B 9/12* (2013.01)

(56) References Cited

U.S. PATENT DOCUMENTS

| | | | |
|---|---|---|---|
| 6,367,579 B1* | 4/2002 | Wiener | H04R 1/021 |
| | | | 181/156 |
| 6,545,661 B1* | 4/2003 | Goschy | A63F 13/04 |
| | | | 345/158 |
| 8,783,781 B1 | 7/2014 | McClure et al. | |
| 2003/0038517 A1 | 2/2003 | Moran et al. | |
| 2013/0316826 A1* | 11/2013 | Levanon | A63F 13/08 |
| | | | 463/36 |
| 2014/0130485 A1* | 5/2014 | Huff | B60K 6/12 |
| | | | 60/327 |

FOREIGN PATENT DOCUMENTS

| | | |
|---|---|---|
| JP | 2000-061149 A | 2/2000 |
| JP | 2000-126456 A | 5/2000 |
| JP | 2009-103796 A | 5/2009 |

OTHER PUBLICATIONS

United Kingdom Search Report for Application No. GB1414290.5 dated Jul. 7, 2015.

United Kingdom Combined Search and Examination Report for Application No. GB1414290.5 dated Feb. 6, 2015.

\* cited by examiner

COMPUTER CONTROLLED FURNITURE AND METHOD

CROSS REFERENCE TO RELATED APPLICATIONS

The present application claims the benefit of and priority to GB Application No. 1414290.5, filed Aug. 12, 2014, the entire disclosure of which is incorporated by reference herein.

BACKGROUND OF THE INVENTION

1. Field of the Invention

The present invention relates to computer controlled furniture and a corresponding method of control.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Computer-controlled furniture was originally integrated into arcade videogame cabinets to provide players with physical feedback in response to on-screen action. Subsequently force feedback chairs have been developed for use with home game consoles and PCs. Both the videogame cabinets and force feedback chairs traditionally use combination of motors and hydraulics to move, thereby giving the illusion of motion to the user. For example in a driving game when the user causes their car to brake, the force feedback chair tilts forward as if the car is braking.

As noted above, these chairs typically use a combination of servo motors and hydraulic or pneumatic pistons or rams. As a result, typically they are expensive and bulky.

Furthermore, recent advancements in virtual reality displays means that the users of such chairs are now likely to also be wearing a virtual reality headset, and as a result cannot see where their hands are in relation to moving components of such a chair. As a result there is a risk of injury if for example hands or fingers are trapped by moving components of the chair.

The present invention aims to alleviate or mitigate the above problems.

SUMMARY OF THE INVENTION

In a first aspect, a re-configurable item of furniture is provided in accordance with claim 1.

In another aspect, a remote device is provided in accordance with claim 11.

In another aspect, a method of reconfiguring an item of furniture is provided in accordance with claim 12.

In another aspect, a method of reconfiguring item of furniture is provided in accordance with claim 13.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Computer controlled furniture and a corresponding method of control are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Overview of Structure of Furniture

Figure 1:
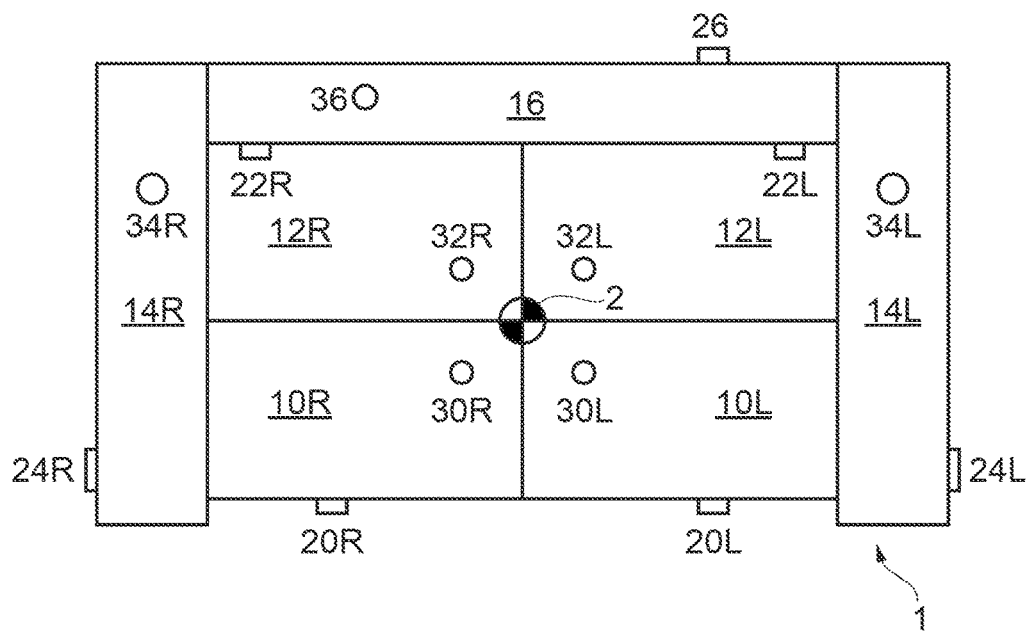
FIG. 1 is a schematic diagram of a plan view of a reconfigurable item of furniture in accordance with embodiments of the present invention.

Referring now to FIG. 1, which is a plan view of a chair, in an embodiment of the present invention an item of furniture (1) such as for example the illustrated chair is constructed at least in part from a plurality of inflatable cells (10R,L; 12R,L). The cells may be made from vinyl, PVC, or any suitable airtight deformable material to allow the cells to deform in response to the combination of their internal pressure and the force applied to them by a user of the chair sitting in it. It will be appreciated that the configuration of cells in FIG. 1 is non-limiting.

One or more of the cells comprise a solenoid release valve (20R,L; 22R,L; 24R,L; 26) allowing air to be released from the cell. One or more of the cells also comprise a solenoid feed valve (30R,L; 32R,L; 34 R,L; 36) allowing air to be fed into the cell.

Other components of the chair may also comprise inflatable cells, such as arm rests or side panels (14R,L), and a backrest or back panel (16). Similarly the base of the chair may also comprise one or more inflatable cells (18) (not shown in FIG. 1).

It will be appreciated that the illustrated set of four inflatable cells in a 2×2 configuration on the seat of the chair is a non-limiting number; for example six cells in a 2×3 configuration (for example providing left and right rear, middle, and front cells), nine cells in a 3×3 configuration, 12 cells in a 3×4 configuration, or similar arrays of 16, 25, etc., cells may be envisaged. It will also be appreciated that the cells do not need to be of equal size.

The chair itself may also be covered in conventional fabrics or padding as desired.

Consequently, to re-create the previously discussed example of a chair tilting forward when a car is braking, air can be released from cells 10R,L through solenoid release valves 20R,L, causing a reduction in pressure in cells 10R,L, which in turn makes these cells relatively more compressible under the weight of a user sat on them. This causes the user sat in the chair to tilt forwards (with respect to the front of the chair) due to the relative loss of support at the front of the chair from those cells.

The user's position can be restored by closing solenoid release valves 20R,L (if still open), and opening solenoid feed valves 30R,L to provide an inflow of pressurised air to reinflate the cells to their previous pressure, thus restoring the level of support they provide to the user and restoring the user's position.

Consequently, in operation the cells act as actuator cells for tilting the user.

It will be appreciated that different combinations of pressure reduction within the actuator cells of the chair can cause it to tilt the user in a number of directions; for example from an initial state, reducing pressure in cells (10L, 12L) on the left of the chair will cause the user to tilt to the left, whilst similarly reducing pressure from that initial state in cells (10R, 12R) on the right of the chair will cause a user to tilt to the right.

Similarly it will be appreciated that reducing pressure in front-right and back-left cells (10R, 12L) to a first extent, and reducing pressure in front left-cell (10L) to a second, greater extent, will cause a user to tilt diagonally towards the front and left. Other combinations for other diagonals will be apparent to the skilled person.

Hence more generally, for a centre of gravity (2) of the user that is assumed to be located centrally on the chair, a reduction in pressure of cells located in a given direction with respect to that centre of gravity will cause the user to tilt in that given direction.

As well as reducing pressure to cause tilting, optionally a complementary increase in pressure may be used in cells located opposite to the given direction of tilt. Hence for example to tilt the user to the left, in addition to reducing pressure in cells (10L, 12L) on the left of the chair, an increase in pressure to cells (10R, 12R) on the right of the chair may also be employed.

Similarly, where pressure is reduced in cells (10R,L) forward of the assumed centre of gravity, then pressure may be increased in cells (12R,L) behind the assumed centre of gravity, and/or in a cell 16 in the backrest, in order to propel the user forward.

However in practice, the majority of cells in the chair are likely to be pressurised to an extent suitable for providing firm and comfortable support when the user is seated normally, and hence if pressurised further may not be able to deform to a sufficient extent to provide significant additional tilt.

However, a complimentary increase in pressure within cells of the chair may nevertheless be used for safety purposes. Hence for the example above where pressure in cells (10L, 12L) to the left of the chair is reduced to cause the user to tilt to the left, a corresponding increase in pressure to a left side panel cell 14L may be used so that the left side panel cell temporarily acts as a more rigid barrier to protect the user from falling out of the chair.

In this way, the chair may be safely constructed from cells whilst avoiding the use of rigid support components such as struts forming a frame for the chair, or alternatively significantly reducing the use of such struts compared to a conventional force feedback chair.

It will be appreciated that a potential advantage of such a chair is it can be fully deflated for storage.

Figure 2:
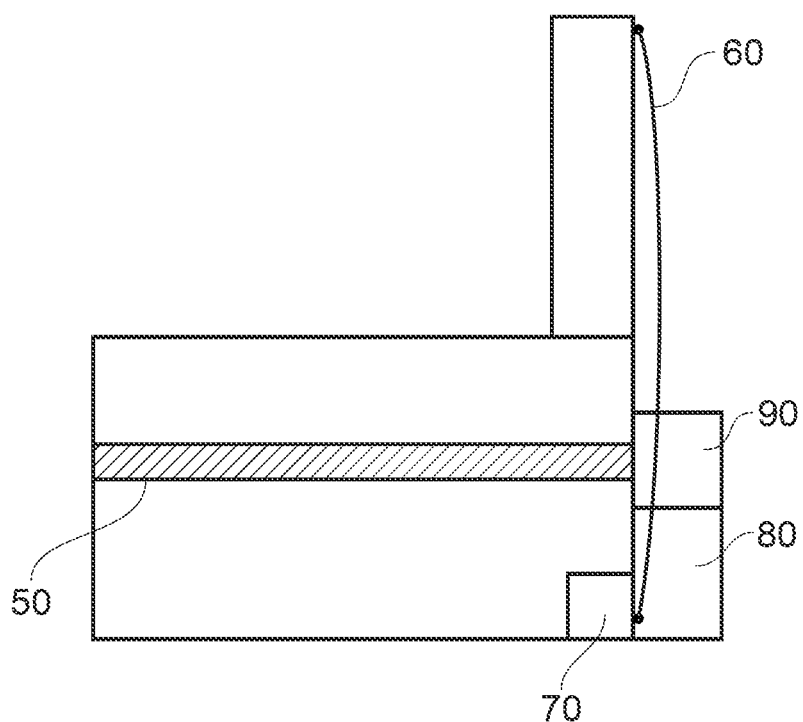
FIG. 2 is a schematic diagram of a side view of a reconfigurable item of furniture in accordance with embodiments of the present invention.

Referring now also to FIG. 2, to facilitate compact storage, and further reduce any need for rigid support components, if the design of the chair requires load-bearing support additional to that provided by the walls of the cells themselves, then high tensile woven straps and/or webbing may be used instead of rigid support components.

Hence for example one or more circumferential straps (50) may be used to prevent walls of the cells bowing outwards under the weight of the user, thereby helping to maintain the shape of the chair during use. Similarly one or more straps (60) at the rear of the chair anchored at the top and bottom of the back of the chair and adjusted to be under tension can help prevent the back of the chair from curving inward when the chair is sat on by the user.

The straps can be attached to the chair by use of Velcro® panels bonded to external surfaces of the chair, or by passing them through belt loop apertures moulded or affixed to the chair. The straps may therefore maintain their operating positions with respect to the chair during successive cycles of inflating, deflating, and storing of the chair with little user maintenance.

In this way the chair may be constructed without or largely without rigid structural components.

Consequently the advantages of an inflatable chair comprising a plurality of cells of the type described above include that it is lightweight, cheap to construct, does not include pistons, rams or motors that could trap fingers, and can be deflated for easy and compact storage.

Airflow Out of the Furniture

Solenoid release valves within cells of the chair may be located in external walls of the cells, thereby releasing air into the general environment.

Alternatively, some or all of these release valves may release air into outflow channels.

In an embodiment of the present invention, these outflow channels direct the released air to a predetermined section of the chair (for example at the back of the chair near the base), so that all the air being released from the chair can be released from substantially the same place. This allows for an acoustic baffle (70) such as a porous sponge or a more sophisticated noise reduction mechanism similar to a car silencer to be employed to reduce noise caused by the release of air.

Alternatively or in addition, in an embodiment of the present invention the outflow channels direct the release of some or all of the air to a compressor (80). The compressor, for example a conventional electrically powered air compressor, may be used to inflate the chair and provide pressurised air for use in the cells, as will be described later herein. Typically, the air released from the cells will be at a higher pressure than air in the surrounding environment, and so providing it to an inlet of the compressor results in a closed or partially closed system in which the compressor has to do less work to raise the pressure of the recycled air to a level used by the chair, thereby making operation of the chair more efficient. Furthermore, the air intake by the compressor serves to reduce the pressure in the outflow channels, making the loss of pressure in actuator cells more rapid due to an increased pressure differential and hence making the actuator cells act more responsively. In addition, recycling or partially recycling the air reduces the amount of air released into the environment and hence also reduces noise caused this release.

Figure 3A:
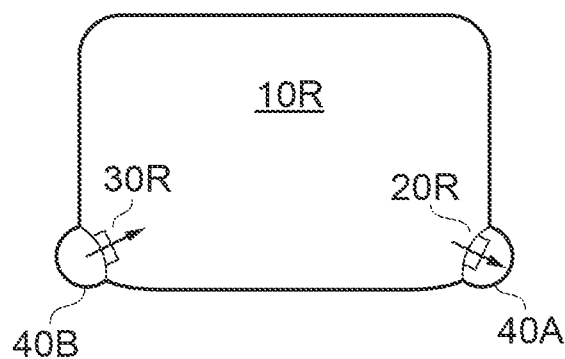
FIGS. 3A-C are schematic diagrams of outflow arrangements in accordance with embodiments of the present invention.

Referring now to FIG. 3A, this illustrates a side on view of one of the actuator cells 10R. As is also illustrated in this figure, the outflow channel 40A described above may itself be formed at least in part from additional narrow cells sharing one or more walls with the actuator cells. Alternatively some or all of the outflow channels may be provided by air hoses distinct from the actuator cells.

Figure 3B:
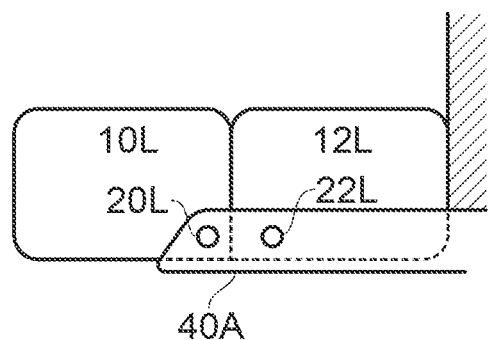
Figure 3C:
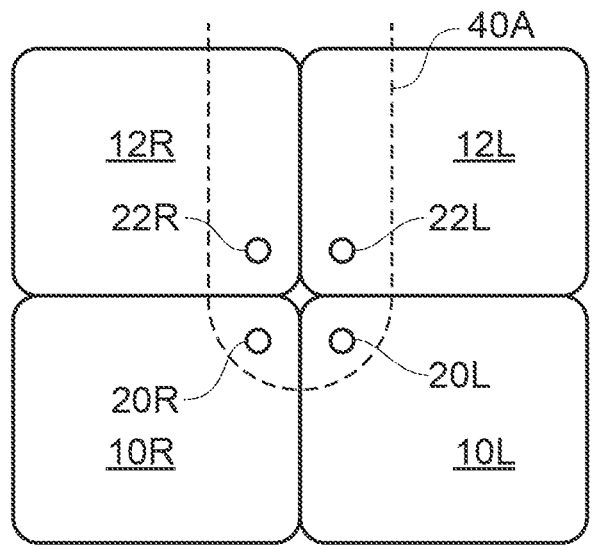

Referring now also to FIGS. 3B and 3C, these respectively show a side view and a plan view of actuator cells, illustrating that a single outflow channel can be shared by multiple actuator cells to simplify construction by reducing the number of outflow channels.

Airflow into the Furniture

Referring again to FIG. 3A, this also illustrates an inflow channel 40B that provides air in to an actuator cell at a pressure higher than the current pressure in that actuator cell. Again an inflow channel may be a narrow longitudinal cell sharing a wall with one or more actuator cells, or may be an air hose.

The source of high pressure air may in a first embodiment be a compressed air canister (or a canister of any suitable compressed gas) (not shown), detachably mounted to an air distribution unit linking the canister to the inflow channels. An advantage of using a compressed air/gas canister is the ability to deliver comparatively high pressure air/gas at very short notice, thereby making the pressurisation of an actuator cell more rapid and hence responsive to in-game activity. However a disadvantage of using a compressed air/gas canister is that it has a limited air/gas supply and is difficult to re-fill by a domestic end user. It would be preferable if the furniture did not have to rely on such a mechanism.

As noted previously in an alternative embodiment of the present invention an electrically driven air compressor is provided, and again may be coupled to an air distribution unit. An advantage of using an air compressor is that it is able to provide a continuous supply of high pressure air using the air in the surrounding environment. However a disadvantage of using an air compressor is that it will be able to provide only a limited volume of high pressure air at any given moment, potentially limiting the ability to rapidly pressurise actuator cells and hence limit the responsiveness of the chair to in-game activity.

Figure 4:
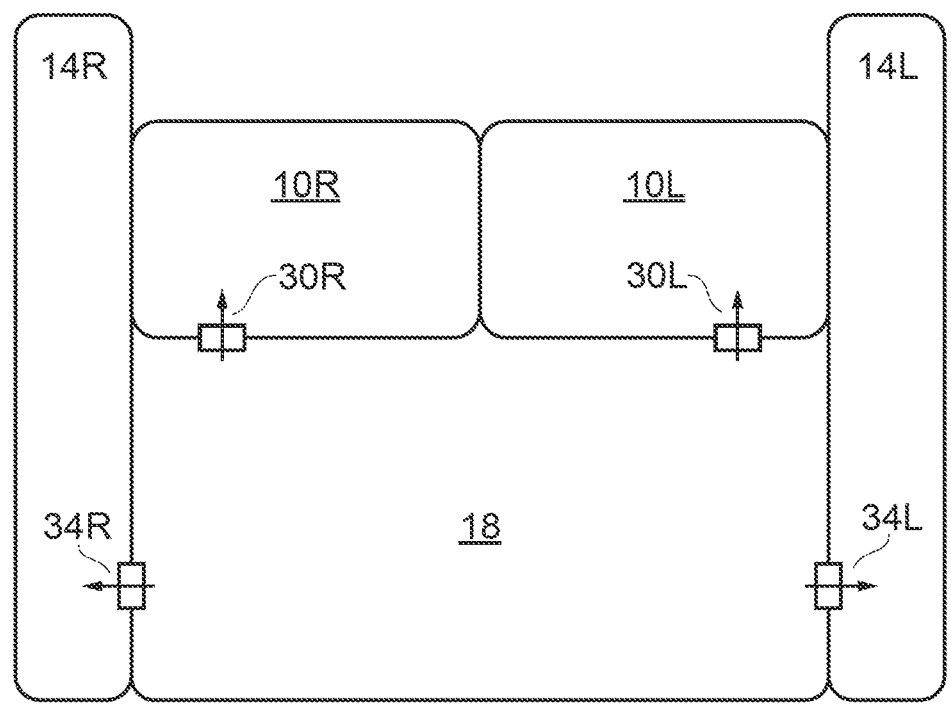
FIG. 4 is a schematic diagram of an inflow arrangement in accordance with embodiments of the present invention.

Accordingly, and referring now also to FIG. 4, in an embodiment of the present invention the base of the chair comprises a high-pressure reservoir cell (18). This reservoir cell may use thicker or stronger material than other cells in the chair to safely contain higher pressure air. In an embodiment of the present invention the air compressor supplies high-pressure compressed air directly to the reservoir. This simplifies the arrangements needed for air distribution from the compressor. It will be appreciated that once the reservoir cell is at a maximum predetermined pressure, a pressure inlet valve between the compressor and the reservoir can prevent further air being pumped in. It will also be appreciated that the maximum rating of the compressor's pressure output can be selected to match the maximum desired pressure within the reservoir cell.

The reservoir cell can thus act as a high-pressure and high-volume reservoir to supply air to actuator cells within the chair at short notice, and itself can be re-pressurised in an ongoing manner by the compressor.

The reservoir cell may then comprise one or more solenoid release valves to release air into the inflow channels that in turn serve the actuator cells, or may directly open into the inflow channels, using the solenoid feed valves from the inflow channels to the actuator cells to control which cells receive high pressure air.

However in an embodiment of the present invention the construction of the chair can be simplified further by appreciating that some or all of the actuator cells can be placed in direct contact with the high-pressure reservoir cell, so that solenoid feed valves penetrating the walls of both the high-pressure reservoir cell and a respective actuator cell can be used to directly couple the reservoir cell with respective actuator cells, thereby removing the need for some or all of the inflow channels.

This is illustrated in FIG. 4, which is a front view of the chair, and shows the high-pressure reservoir cell 18 acting as a firm base for the chair, and showing that for the front two actuator cells of the seat (10R,L), their solenoid feed valves (30R,L) penetrate the walls of both the respective actuator cell and the high-pressure reservoir cell, so that there is a direct link between the reservoir and actuator cells controlled by a single respective solenoid feed valve (simultaneously acting as a solenoid release valve for the high-pressure reservoir cell). It will be appreciated that this principle can also be applied to the armrest or side panel cell (14L) through its respective solenoid feed valve (34L), and similarly also the backrest (16). It will be appreciated optionally that the backrest may act as a further high-pressure reservoir cell able to feed the base reservoir cell if needed, or may be an integral part of the same high-pressure reservoir. By maintaining the backrest at a high-pressure for the majority of use, this can provide additional structural rigidity to the chair.

In this way high-pressure and high-volume air can be supplied to respective actuator cells within the chair using a simple construction method wherein cells that are placed adjacent to the high-pressure base unit can be operably coupled to it by solenoid valves, with little or no need for inflow channels or air hoses.

It will be appreciated that if the airflow through a single solenoid valve is insufficient to inflate an actuator cell as rapidly as is desired, either larger solenoid valves or multiple solenoid valves may be used between the reservoir cell and the actuator cell to increase airflow.

Control of Airflow within Furniture

Each solenoid valve in the chair is electrically coupled to a control unit (90), for example by wire. Wires may be effectively channelled between actuator cells. For example the wires controlling solenoid valves between a high-pressure reservoir 18 and front actuator cells (10R,L) may be channelled through a gap between these three cells to the back of the chair. Wires for other solenoid valves may make use of this or other gaps between actuator cells.

In an embodiment of the present invention, solenoid feed valves for neighbouring actuator cells are located near shared corners of the actuator cells to reduce the amount of wiring needed outside of such shared gaps.

Given the deformable nature of the furniture, the wiring may comprise additional lengths near the solenoid valves or at predetermined points within the chair to allow for increases in path length between the control unit and a given solenoid valve during operation of the furniture.

It will also be appreciated that if the solenoid valves are each coupled to a respective control microchip, they may be made addressable and share a common power line.

Where inflow channels and/or outflow channels are used, will be appreciated that wires can be placed within these channels as these also route to the solenoid valves.

Hence, particularly in the case where wires are placed within inflow and/or outflow channels, it is preferable for the control unit to be located close to the compressor (or gas canister and a distribution unit) so that wires can be introduced to the channels at source. In any event, the control unit may be placed close to the compressor so that it can make use of the same external power supply as the compressor and so that the heavy and hard components of the chair are all located in the same place away from the user.

The control unit opens or shuts the solenoid valves by selectively providing power to them, or selectively sending a suitable signal to them, depending on the type of solenoid valve used.

In an embodiment of the present invention, the control unit comprises a wired or wireless receiver (such as a Bluetooth® receiver, Wi-Fi® receiver or infrared receiver), operable to receive control signals from a remote device such as a video game console, PC or the like, and uses these control signals to operate the solenoid valves accordingly. Hence for example the control signals may comprise packets with a payload comprising a binary pattern in which each bit corresponds to a valve within the chair, the pattern indicating which valves should be open or shut at a given moment. In this way timing for control of the solenoid valves is provided.

Optionally the control unit may comprise a processor arranged to validate such a binary pattern or other control signal scheme to ensure that there has been no data corruption that could result in unsafe solenoid operation, such as for example rapid deflation of the side panels in conjunction with rapid deflation of some or all of the actuator cells in the seat of the chair. In the event that data corruption is detected, the control unit may simply repeat the solenoid valve configuration from the previously received packet, or as a precaution close all solenoids until a valid packet is received.

It will be appreciated that packets can be received frequently (for example many times per second) and consequently in practice fine control of pressure in the cells will only be limited by the responsiveness of the solenoid valves. As noted above certain configurations of the chair (such as a diagonal tilt) may be achieved using different changes of pressure in different cells. This can clearly be achieved by using different timings for the opening solenoid valves. Alternatively to change air pressure to a different extent in different cells over the same period of time to give a more controlled experience to the user, different duty cycles may be selected for opening and closing solenoid valves in different cells to effectively differentiate the relative flow rate from or to respective cells.

Meanwhile the remote device/games console is arranged to generate control signals for the chair in response to in-game activity; hence for example in racing games the console may provide signals to tilt left or right as a vehicle turns left or right and tilt forwards or backwards as the vehicle breaks or accelerates. Similarly if the vehicle jumps over a ramp or similar, the console may provide signals for the actuator cells in the seat to simultaneously lose pressure and re-pressurise to cause the user to feel a bump. Similarly explosions may result in a pattern of pressure changes within the actuator cells causing the chair to rumble as if in an earthquake. Other control patterns and other activities will be apparent to the skilled person.

It will be appreciated that control signals need not be limited to videogame consoles. For example metadata may be provided for television and film content, so that for example in a car chase the user experiences similar motion effects to those described above. Such metadata may be included in recorded media comprising the television or film content, or in response to detection of the content, may be downloaded from a server hosting such metadata. In this way any suitably adapted media player or smart television may potentially control the chair.

Figure 5:
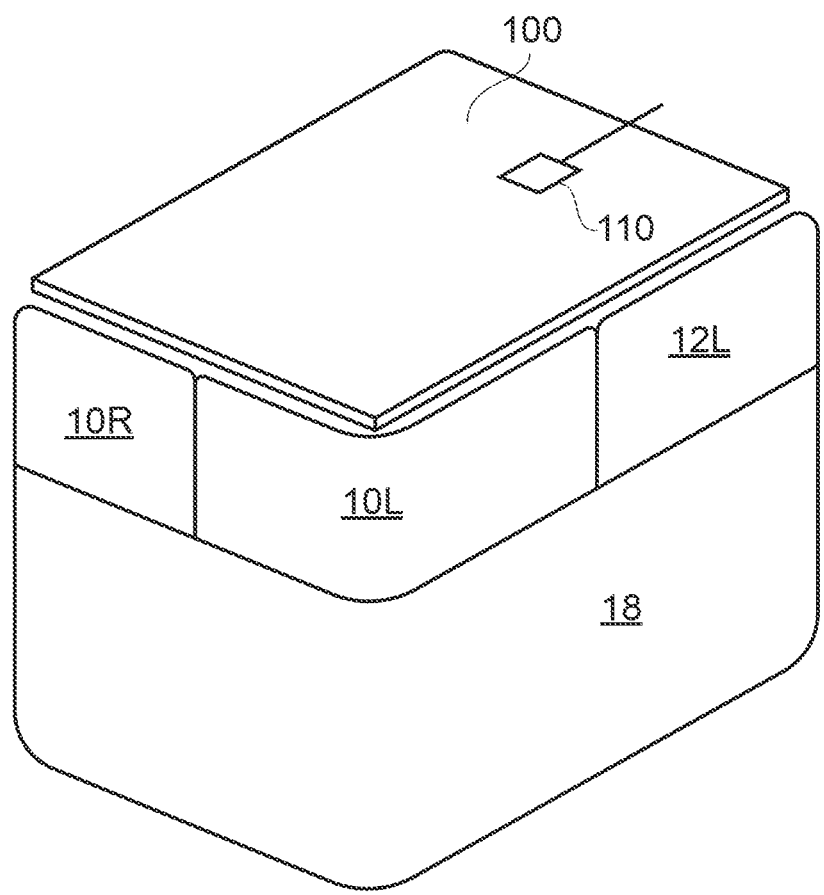
FIG. 5 is a schematic diagram of a partial isometric view of a reconfigurable item of furniture in accordance with embodiments of the present invention.

Furthermore, referring now also to FIG. 5, which shows an isometric view of parts of the chair, in an embodiment of the present invention a padded rigid seating unit (100) is provided that can be placed on top of the actuator cells of the seat. This padded rigid seating unit can be used to provide a more comfortable seat for the user. In particular, this padded rigid seating unit can be used to prevent the user from feeling the edges of actuator cells within the seat where for example the front actuator cells reduced pressure but the rear actuator cells do not, potentially causing an uncomfortable edge or lip between the front and rear actuator cells.

Optionally in this embodiment the padded rigid seating unit may comprise one or accelerometers (110) to provide tilt feedback signals to the control unit. In this instance, the control unit may be equipped to receive signals from the console, media player or the like to tilt the user by a certain angle rather than receive signals controlling each solenoid, and then the control unit itself can control the solenoids to tilt the user responsive to the feedback signals from the padded rigid seating unit. Alternatively the feedback signals from the padded rigid seating unit can be transmitted back to the console, media player or the like, which can update the signals it transmits controlling each solenoid.

Similarly optionally, feedback signals may be provided to the control unit from pressure sensors (not shown) within some or all of the cells within the item of furniture, to enable the control unit (or the remote device if the control unit merely acts as a relay) to detect when a cell has reached a pressure calculated to achieve a desired tilt or restoration from a tilt, either as an absolute pressure, or as a pressure relative to other actuator cells utilised in the tilt or restoration action. Such a pressure sensor can also be used as a safety measure to detect a catastrophic loss of pressure in the case that a cell bursts, enabling the control unit or remote device to rapidly compensate by tilting the user away from the burst cell. Hence for example if a cigarette burn cause the left side panel to burst, the control unit or remote device would detect the loss of pressure in the left side panel, and tilt the user to the right, or at the very least override and/or rectify any current tilt to the left. The pressure sensor can be integrated with, mounted on, or adjacent to a solenoid valve and make use of wires providing power to the valve both to obtain power and transmit signals back to the control unit, or may be integrated with or operably coupled to a control microchip in the case where solenoid valves are addressably controlled on a common wire.

It will be appreciated that the above methods of control may be carried out on conventional hardware such as a games console, PC, media player, satellite or cable TV receiver, or smart TV, and the like, suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

Variations

In a variant embodiment of the present invention, an outflow reservoir cell may be provided to receive air from some or all of the actuator cells. The connection between the actuator cells and the outflow reservoir cell may be by outflow channels or air hoses as described above, or may be by direct connection through a solenoid valve where an actuator sell shares a wall with the reservoir cell, in a similar arrangement to that described above for the high-pressure reservoir cell. The outflow reservoir cell can provide means to accommodate a sudden outflow of air greater than that which can be taken by the compressor. In an embodiment of the present invention, the high-pressure reservoir cell may take the form of an annular ring, or comprise a central depression, and the outflow reservoir cell may occupy the centre of the ring or the centre of the depression. Alternatively the reservoir cell may be placed at the back of the chair.

It will be appreciated that the example of a chair using the above description is non-limiting, and may for example also apply to a sofa comprising two or three seating areas with respective sets of actuator cells. In this case, different seats may be associated with different players of the game, and respective players may be identified for example by suitable activation of a button on a controller or by suitable movement gesture by a head mounted display in response to a prompt from the console.

Similarly the chair or sofa may also include other pressure configurable features, such as a footrest comprising a wedge shaped cell located at the lower front of the chair that can be inflated to provide additional support for the user's lower legs. Such a cell may use a resilient material will be constrained by resilient strap, so that upon deflation it automatically returns to earn unobtrusive stowed position flush to the front of the chair. Similar cells may be provided at the back of the chair; In this case for example a wedge shaped cell may be inflated by default, and deflated to cause the chair back to recline.

Similarly a conventional chair or sofa may be retrofitted with a minimal implementation of just the actuator cells for a seat, such as cells 10R,L and 12R,L, or any equivalent array of such cells as described previously, optionally together with the padded rigid seating unit described previously. For example this intimidation may take the form of a replacement padded seating cushion which can be swapped for one provided with the conventional chair or sofa. In conjunction with a compressor and control unit as described previously, this would allow a user to enjoy some of the benefits of the full chair if they do not have space to inflate the chair, or have placed a preferred conventional chair or sofa at a specific position with respect to television, speakers etc., and do not wish to move it to make space for the full chair. Typically such a retrofit would be less responsive as it may not comprise a high-pressure reservoir cell, and because it may be necessary to use smaller or flatter actuator cells in order to fit safely within a conventional chair. It will be appreciated that different versions of such a retrofit could be offered with greater or fewer cells (for example also including a back cell) and/or with cells having greater or lesser volume.

Similarly the furniture need not be limited to entertainment functions. Hence in a separate embodiment, a care bed for domestic or hospital use may be equipped with a combination of actuator cells allowing inflation to raise a head end of the bed in conjunction with deflation to lower a central portion of the bed to a preferred level set by the user, to assist them with getting in and out of bed. The rate and extent of inflation and deflation of the respective cells can be set by the user and controlled by a control unit of the bed or, for example via a smartphone application providing an intuitive interface for the user; the smart phone can communicate with the control unit using Bluetooth® or similar as described previously. Again, such a bed may include suitably placed accelerometers to provide tilt feedback to the control unit or smart phone application.

SUMMARY

Reflecting the above description, in a summary embodiment of the present invention a re-configurable item of furniture (such as for example a chair or sofa) comprises at least a first reconfigurable portion (such as the seating area of the chair). This comprises in turn a plurality of deformable cells (for example actuator cells 10R,L and 12R,L), each having electrically operated valves (such as solenoid feed valves 30R,L and 32R,L and solenoid outflow valves 20R,L and 22R,L) to control a gas inflow to the respective cells from a gas inflow source (such as a compressed gas canister or a compressor 80), and a gas outflow from the respective cells, to thereby modify the pressure within respective cells. A control unit (90) is arranged to transmit control signals (for example as current in respective wires or as addressable signals in shared wires) to a plurality of the electrically operated valves (e.g. a subset relevant to the desired change of configurations) to modify the pressure within a plurality of the cells in a coordinated manner selected to generate a new configuration of support for a user of the furniture. Examples of this coordination given above include tilting the user forwards using front actuator cells (10R,L), and similarly tilting the user left or right using selected actuator cells, optionally with a corresponding protective increase in pressure to a side support, or arranging actuator cells to tilt the user in a diagonal.

In an instance of this summary embodiment, the first reconfigurable portion comprises an array of the deformable cells arranged to occupy a seating area to be sat on by a user. As noted above an example array is a 2×2 array of cells (10R,L and 12R,L), but other arrays including arrays of irregularly shaped or sized cells may be considered.

In an instance of this summary embodiment, the gas inflow source is applied by an air compressor. As noted above typically this will be a conventional air compressor that can be powered by a domestic mains supply.

In an instance of this summary embodiment, a gas outflow from one or more of the respective cells leads to an input of the air compressor. As noted above, this can make the air compressor more efficient as the gas outflow is likely to have a higher pressure than ambient, and may also reduce noise.

In instance of this summary embodiment, the gas inflow source comprises a high-pressure reservoir cell. As noted above the air compressor can feed a high-pressure reservoir cell, typically located in the base of the chair, where the comparative rigidity of the high-pressure cell can provide more stable support for the chair. The high-pressure reservoir cell is operable to provide air to actuator cells either directly via shared valves or via channels or air hoses as required.

Hence in this instance, for one or more of the cells the electrically operated valve controlling gas inflow to the respective cell directly couples the respective cell to the high-pressure reservoir cell.

In instance of this summary embodiment, a plurality of the electrically operated valves share a common power line, and open or close in response to instructions associated with respective IDs. For example each valve can be associated with a respective ID or address monitored by a controller chip operably coupled to the valve, and signals are sent to the valve by transmitting the respective address together with a flag indicating whether the valve should open or close. In principle just the address could be used to toggle the current state of the valve, but the lack of an explicit flag risks a valve going out of synchronisation with its intended state if a transmission is missed by the controller chip for any reason (for example due to electrical noise from the compressor corrupting the ID).

In an instance of this summary embodiment, the reconfigurable item of furniture comprises at least a first high tension flexible restraint arranged to limit expansion of a portion of the item of furniture beyond a certain set extent. As noted above, a circumferential strap may be used to protect the chair from bowing outward for example when the user sits on it. In particular a strap or plural straps may be used to limit expansion of the high-pressure reservoir cell.

In an instance of this summary embodiment, the coordinated modification of pressure within the plurality of cells can be selected so as to increase pressure in a cell that rises above the seating area and is located in a direction to which the new configuration of support will tilt a user of the furniture. Hence for example as noted above, as a safety precaution a side arm or side panel can increase its pressure to act as a more rigid barrier when the actuator cells in the seat tilt the user towards it. Similarly the backrest could temporarily increase its pressure if the actuator cells tilt the user backwards.

In an instance of this summary embodiment, the reconfigurable item of furniture comprises a padded rigid seating unit positioned on top of cells in a seating area of the chair, and the padded rigid seating unit comprises an accelerometer operable to indicate the direction and amount of tilt of the padded rigid seating unit. As noted above indicated direction and amount of tilt can be fed back to the control unit and thereon to the remote device to detect when a desired new support configuration has been achieved.

In an instance of this summary embodiment the reconfigurable item of furniture comprises a receiver, and the receiver is arranged in operation to receive instructions representative of the new configuration of support from a remote device. As noted previously these instructions may define the new configuration by direct control of individual solenoid valves, allowing for a simpler control unit, or may define the new configuration parametrically, for example as one of a predetermined number of configurations, or by requesting a certain direction and amount of tilt, requiring the control unit to calculate the required control of the individual solenoid valves required to achieve the requested configuration.

In a summary embodiment of the present invention, a remote device (such as a video game console, set-top box, smart TV, media player or the like) comprises instruction processing means (such as a CPU) operable to generate instructions representative of a new configuration of support for a reconfigurable item of furniture, responsive to current visual content being output by the remote device (for example a videogame, TV or film, accessing complimentary configuration metadata if necessary), and also comprises a transmitter operable to transmit the generated instructions to the reconfigurable item of furniture (as noted above for example Bluetooth®, Wi-Fi® or infrared).

Figure 6:
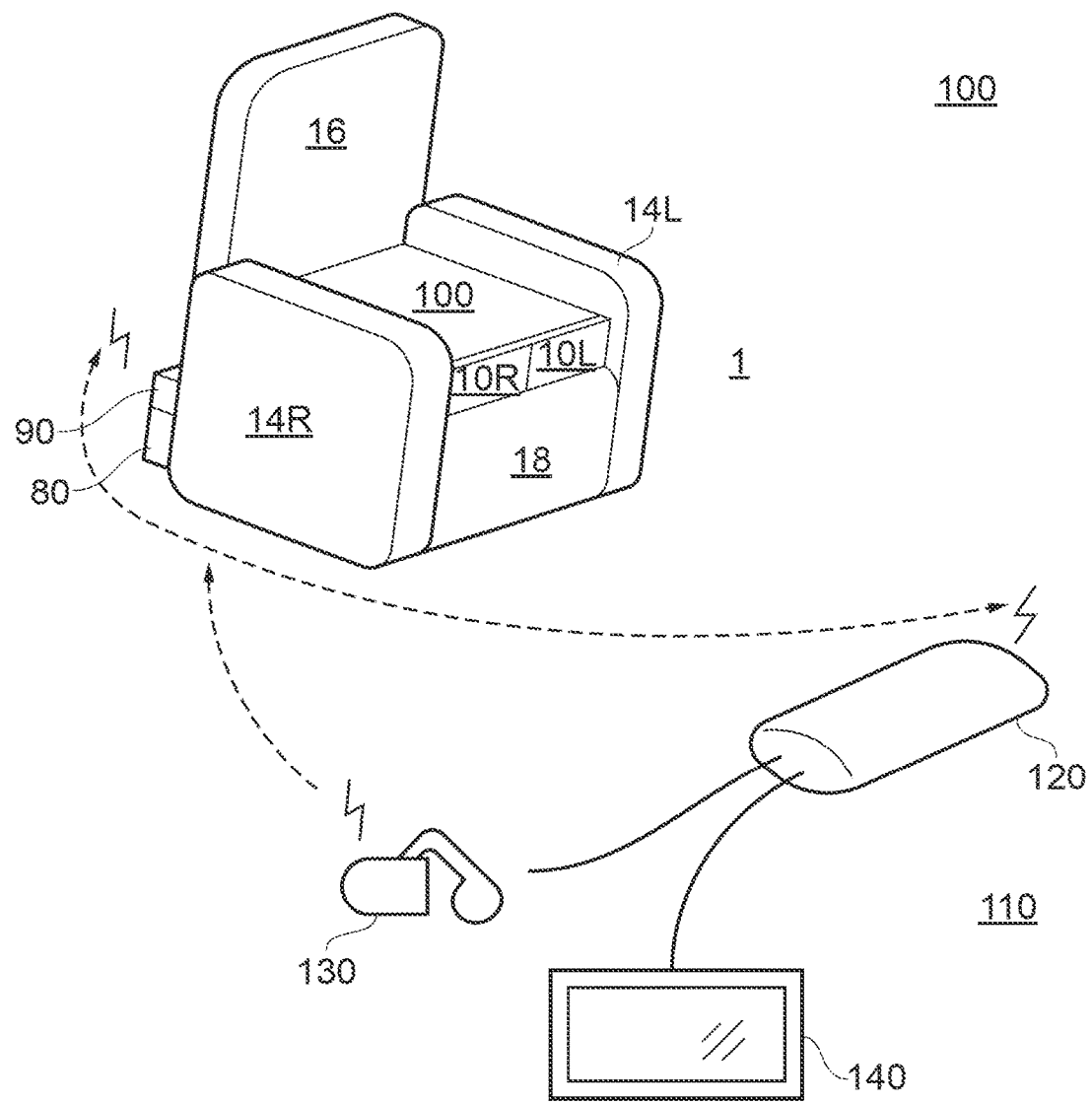
FIG. 6 is a schematic diagram of a system in accordance with embodiments of the present invention.

Referring now also to FIG. 6, it will be appreciated that the reconfigurable furniture (1) and the remote device (110) operate together as a system 100 for providing a force feedback experience to a user in response to content being output by the remote device. Will be appreciated further that the remote device may itself comprise a system such as a console 120 and a head mounted display 130, in which the head-mounted display comprises accelerometer is operable to detect motion of the user. Consequently it is possible that the reconfigurable furniture may receive signals from both the head mounted display indicative of the users posture, as well as signals from the console indicative of a desired reconfiguration of the chair. In these circumstances the control unit may combine these signals to provide a reconfiguration sensitive to the user's current posture. Alternatively this combination may performed by the console, causing it to modify the instructions it sends to the reconfigurable furniture. Meanwhile in other configurations, the remote device may operate on its own, displaying output to a fixed television 140.

Figure 7:
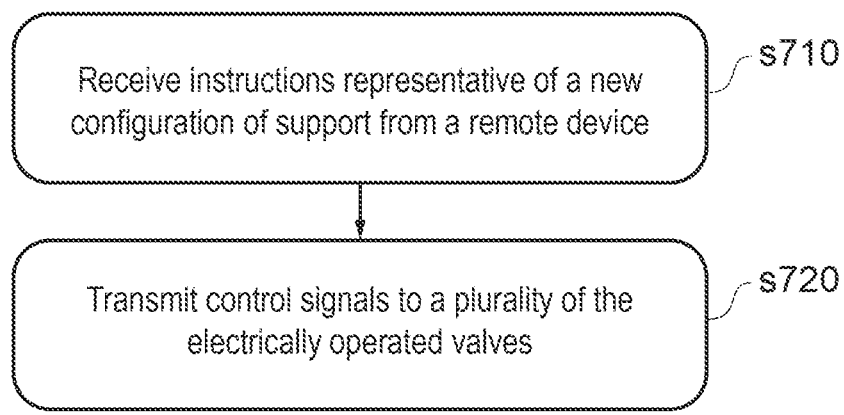
FIG. 7 is a flow diagram of a method of reconfiguring out of the furniture in accordance with embodiments of the present invention.

Turning now to FIG. 7, a summary embodiment of the present invention a method of reconfiguring an item of furniture (where the furniture comprises at least a first reconfigurable portion comprising in turn a plurality of deformable cells, each having electrically operated valves to control a gas inflow to the respective cells from a gas inflow source, and a gas outflow from the respective cells, to thereby modify the pressure within respective cells, and a control unit) comprises in a first step s710, receiving instructions representative of a new configuration of support from a remote device, and in a second step s720, transmitting (within the furniture) control signals to a plurality of the electrically operated valves to modify the pressure within a plurality of the cells in a coordinated manner selected to generate the new configuration of support for a user of the furniture.

Figure 8:
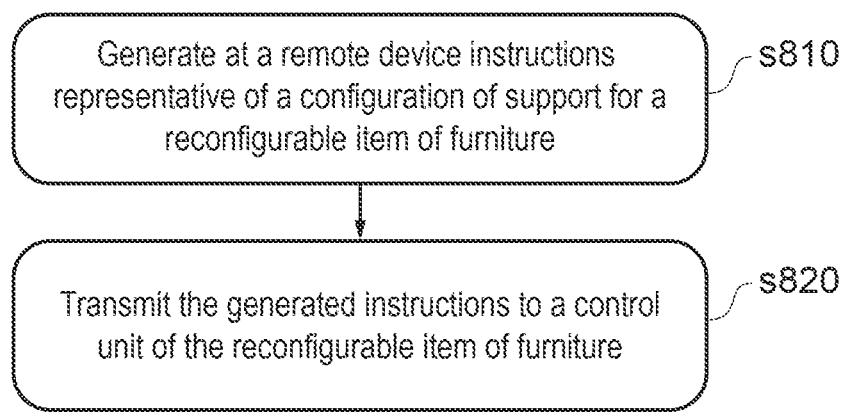
FIG. 8 is a flow diagram of a method of reconfiguring out of the furniture in accordance with embodiments of the present invention.

Similarly referring now to FIG. 8, in a summary embodiment of the present invention a method of reconfiguring an item of furniture (where the furniture comprises at least a first reconfigurable portion comprising in turn a plurality of deformable cells, each having electrically operated valves to control a gas inflow to the respective cells from a gas inflow source, and a gas outflow from the respective cells, to thereby modify the pressure within respective cells) comprises in a first step s810, generating at a remote device instructions representative of a configuration of support for a reconfigurable item of furniture, responsive to current visual content being output by the remote device, and in a second step s820, transmitting the generated instructions to a control unit of the reconfigurable item of furniture.

As noted previously herein, the above methods may be permitted using conventional hardware suitably adapted by software instruction to implement the steps of a respective method.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A re-configurable item of furniture, comprising:
at least a first reconfigurable portion comprising in turn:
a plurality of deformable cells, each respective one of the plurality of deformable cells having electrically operated valves to control a gas inflow to the respective cells from a gas inflow source, and a gas outflow from the respective cells, to thereby modify a pressure within respective cells; and
a control unit arranged to transmit control signals to a plurality of the electrically operated valves to modify the pressure within a plurality of the cells in a coordinated manner selected to generate a new configuration of support for a user of the furniture; and
wherein the gas inflow source comprises a high-pressure reservoir cell that is one of the plurality of deformable cells and forms a portion of the support for the user, a configuration of the first reconfigurable portion being determined based at least on a configuration of the high-pressure reservoir cell; and
wherein the coordinated modification of pressure within the plurality of cells is selected so as to increase pressure in a cell that rises above a seating area and is located in a direction to which the new configuration of support will tilt a user of the furniture.

2. A re-configurable item of furniture according to claim 1, in which
the first reconfigurable portion comprises an array of the deformable cells arranged to occupy a seating area to be sat on by a user.

3. A re-configurable item of furniture according to claim 1, in which the gas inflow source is supplied by an air compressor.

4. A re-configurable item of furniture according to claim 3, in which the gas outflow from one or more of the respective cells leads to an input to the air compressor.

5. A re-configurable item of furniture according to claim 1, in which for one or more of the respective cells, the electrically operated valve controlling gas inflow to the one or more respective cells directly couples the one or more respective cells to the high-pressure reservoir cell.

6. A re-configurable item of furniture according to claim 1, in which a plurality of the electrically operated valves share a common power line, and open or close in response to instructions associated with respective IDs.

7. A re-configurable item of furniture according to claim 1, comprising:
at least a first high tension flexible restraint arranged to limit expansion of a portion of the item of furniture beyond a certain set extent.

8. A re-configurable item of furniture according to claim 1, comprising:
a padded rigid seating unit positioned on top of cells in a seating area of the chair,
the padded rigid seating unit comprising an accelerometer operable to indicate a direction and amount of tilt of the padded rigid seating unit.

9. A re-configurable item of furniture according to claim 1, in which the control unit comprises:
a receiver;
and is arranged in operation to receive instructions representative of the new configuration of support from a remote device.

10. A remote device, comprising:
instruction processing means operable to generate, responsive to current visual content being output by the remote device, instructions representative of a new configuration of support for a reconfigurable item of furniture that in turn comprises at least a first reconfigurable portion comprising in turn a plurality of deformable cells, each respective one of the plurality of deformable cells having electrically operated valves to control a gas inflow to the respective cells from a gas inflow source, and a gas outflow from the respective cells, to thereby modify a pressure within respective cells, wherein the gas inflow source comprises a high-pressure reservoir cell that is one the plurality of deformable cells and forms a portion of the support for the reconfigurable item of furniture, a configuration of the first reconfigurable portion being determined based at least on a configuration of the high-pressure reservoir cell; and
a transmitter operable to transmit the generated instructions to the reconfigurable item of furniture; and
wherein the modification of pressure within the plurality of cells is selected so as to increase pressure in a cell that rises above a seating area and is located in a direction to which the new configuration of support will tilt a user of the furniture.

11. A method of reconfiguring an item of furniture comprising at least a first reconfigurable portion comprising in turn a plurality of deformable cells, each respective one of the plurality of deformable cells having electrically operated valves to control a gas inflow to the respective cells from a gas inflow source, and a gas outflow from the respective cells, to thereby modify a pressure within respective cells, wherein the gas inflow source comprises a high-pressure reservoir cell that is one of the plurality of deformable cells and forms a portion of support for a user of the furniture, a configuration of the first reconfigurable portion being determined based at least on a configuration of the high-pressure reservoir cell, the item of furniture also comprising a control unit, the method comprising the steps of:
receiving instructions representative of a new configuration of support from a remote device; and
transmitting control signals to a plurality of the electrically operated valves, including a valve of the high-pressure reservoir cell, to modify the pressure within given ones of the cells in a coordinated manner selected to generate the new configuration of support for the user of the furniture; and
wherein the coordinated modification of pressure within the plurality of cells is selected so as to increase pressure in a cell that rises above a seating area and is located in a direction to which the new configuration of support will tilt a user of the furniture.

12. A method of reconfiguring an item of furniture that comprises at least a first reconfigurable portion comprising in turn a plurality of deformable cells, each respective one of the plurality of deformable cells having electrically operated valves to control a gas inflow to the respective cells from a gas inflow source, and a gas outflow from the respective cells, to thereby modify a pressure within respective cells, wherein the gas inflow source comprises a high-pressure reservoir cell that is one of the plurality of deformable cells and forms a portion of support for the item of furniture, a configuration of the first reconfigurable portion being determined based at least on a configuration of the high-pressure reservoir cell, the method comprising the steps of:

generating at a remote device instructions representative of a configuration of the support for the item of furniture, responsive to current visual content being output by the remote device; and transmitting the generated instructions to a control unit of the reconfigurable item of furniture; and wherein the modification of pressure within the plurality of cells is selected so as to increase pressure in a cell that rises above a seating area and is located in a direction to which a new configuration of support will tilt a user of the furniture.

13. A non-transitory computer program product comprising a tangible computer readable medium storing computer instructions thereon, the computer instructions adapted to cause a computer to carry out a method of:

reconfiguring an item of furniture that comprises at least a first reconfigurable portion comprising in turn a plurality of deformable cells, each respective one of the plurality of deformable cells having electrically operated valves to control a gas inflow to the respective cells from a gas inflow source, and a gas outflow from the respective cells, to thereby modify a pressure within respective cells, wherein the gas inflow source comprises a high-pressure reservoir cell that is one of the plurality of deformable cells and forms a portion of support for the item of furniture, a configuration of the first reconfigurable portion being determined based at least on a configuration of the high-pressure reservoir cell, the reconfiguring step in turn comprising the steps of:

generating instructions representative of a configuration of the support for the item of furniture, responsive to current visual content being output by a remote device; and transmitting the generated instructions to a control unit of the reconfigurable item of furniture; and wherein the modification of pressure within the plurality of cells is selected so as to increase pressure in a cell that rises above a seating area and is located in a direction to which a new configuration of support will tilt a user of the furniture.

* * * * *